United States Patent [19]

Bielfeldt et al.

[11] Patent Number: 5,042,372
[45] Date of Patent: Aug. 27, 1991

[54] CONTINUOUSLY WORKING PRESS

[75] Inventors: Friedrich B. Bielfeldt; Detlef Kroll, both of Eppingen, Fed. Rep. of Germany

[73] Assignee: Maschinenfabrik J. Dieffenbacher GmbH & Co., Eppingen, Fed. Rep. of Germany

[21] Appl. No.: 535,200

[22] Filed: Jun. 8, 1990

[30] Foreign Application Priority Data

Jun. 8, 1989 [DE] Fed. Rep. of Germany ....... 3918757

[51] Int. Cl.⁵ .................... B30B 15/34; B30B 5/06
[52] U.S. Cl. ........................ 100/38; 100/41; 100/93 P; 100/154; 156/583.5; 198/626.6; 198/833; 425/371
[58] Field of Search .............. 100/35, 38, 41, 93 P, 100/93 RP, 15, 153, 154; 156/555, 583.5; 264/120; 198/626.4, 626.6, 833; 425/371

[56] References Cited

U.S. PATENT DOCUMENTS

| | | | |
|---|---|---|---|
| 2,075,735 | 3/1937 | Loomis . | |
| 2,142,932 | 1/1939 | Beard | 100/154 X |
| 3,929,065 | 12/1975 | Csordas et al. | 100/154 X |
| 3,981,666 | 9/1976 | Wadman | 425/371 |
| 4,375,350 | 3/1983 | Sato | 425/371 |
| 4,451,322 | 5/1984 | Dvorak | 100/93 P X |
| 4,613,293 | 9/1986 | Gerhardt | 425/371 |
| 4,621,999 | 11/1986 | Gerhardt | 425/371 |
| 4,647,417 | 3/1987 | Böttger et al. | 264/120 |
| 4,718,843 | 1/1988 | Carlsson et al. | 100/154 X |
| 4,923,384 | 5/1990 | Gerhardt | 425/371 |

FOREIGN PATENT DOCUMENTS

| | | |
|---|---|---|
| 2037442 | 2/1972 | Fed. Rep. of Germany . |
| 2222419 | 11/1972 | Fed. Rep. of Germany . |
| 2343427 | 3/1975 | Fed. Rep. of Germany . |
| 3133792 C2 | 7/1985 | Fed. Rep. of Germany . |
| 1151500 | 5/1969 | United Kingdom . |

Primary Examiner—Harvey C. Hornsby
Assistant Examiner—Stephen F. Gerrity
Attorney, Agent, or Firm—Foley & Lardner

[57] ABSTRACT

A continuously working press is provided with a device which adjusts an entry gap in an entry region of a press ram to give the rolling rods of a press a sufficient degree of freedom for self-stabilization. The adjusting device includes an articulated crosshead anchored in said press frame and pivotable about an axis of rotation, a pressure holding plate located within said entry region and adjustable about an axis of rotation and which acts non-positively but resiliently on said rolling rods as they travel through the entry region, and a plurality of hydraulic supporting members located between the articulated crosshead and the pressure holding plate and which are adapted to act on said support device with a pressure profile that increases continuously towards said pressing region.

20 Claims, 6 Drawing Sheets

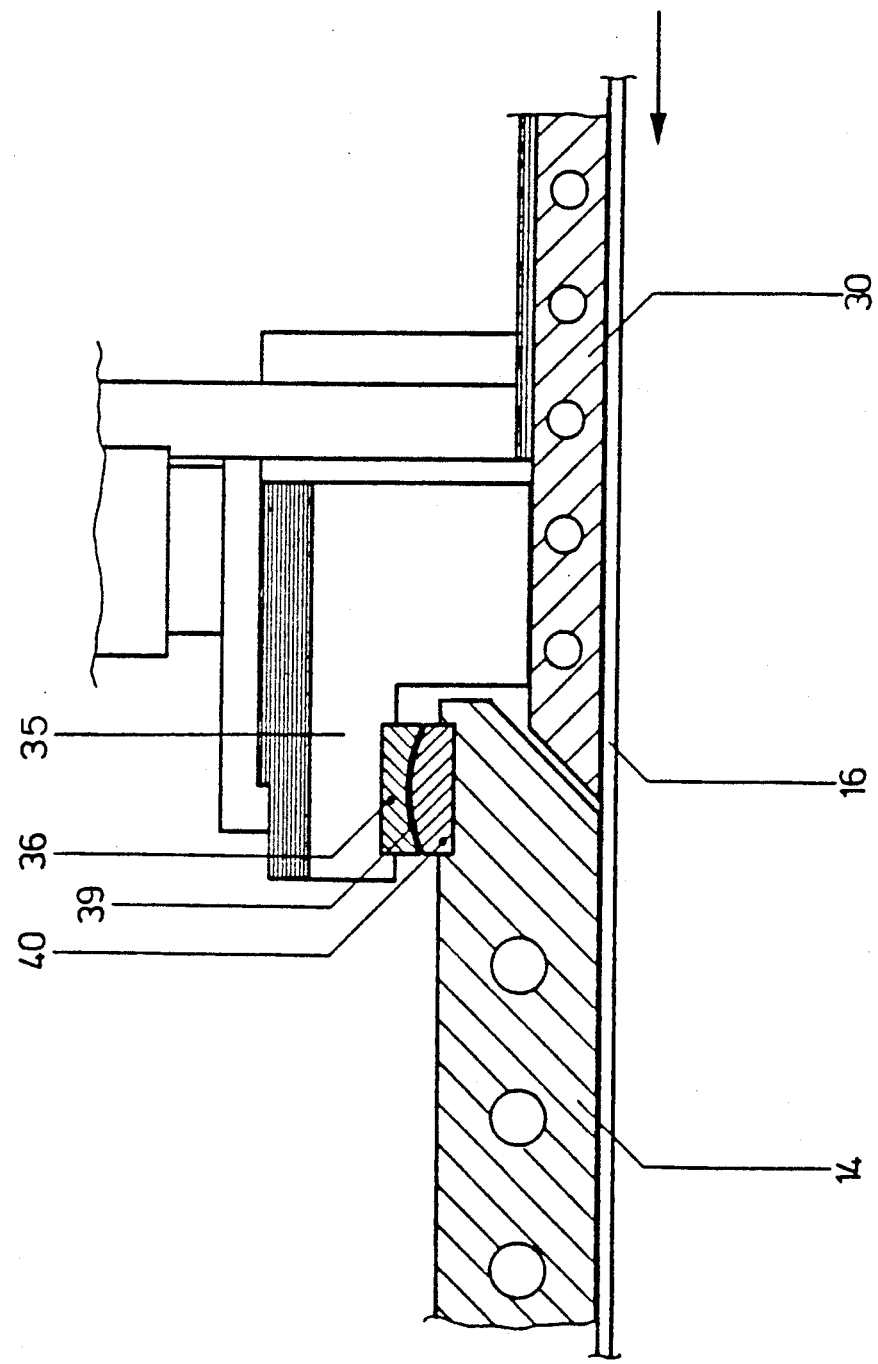

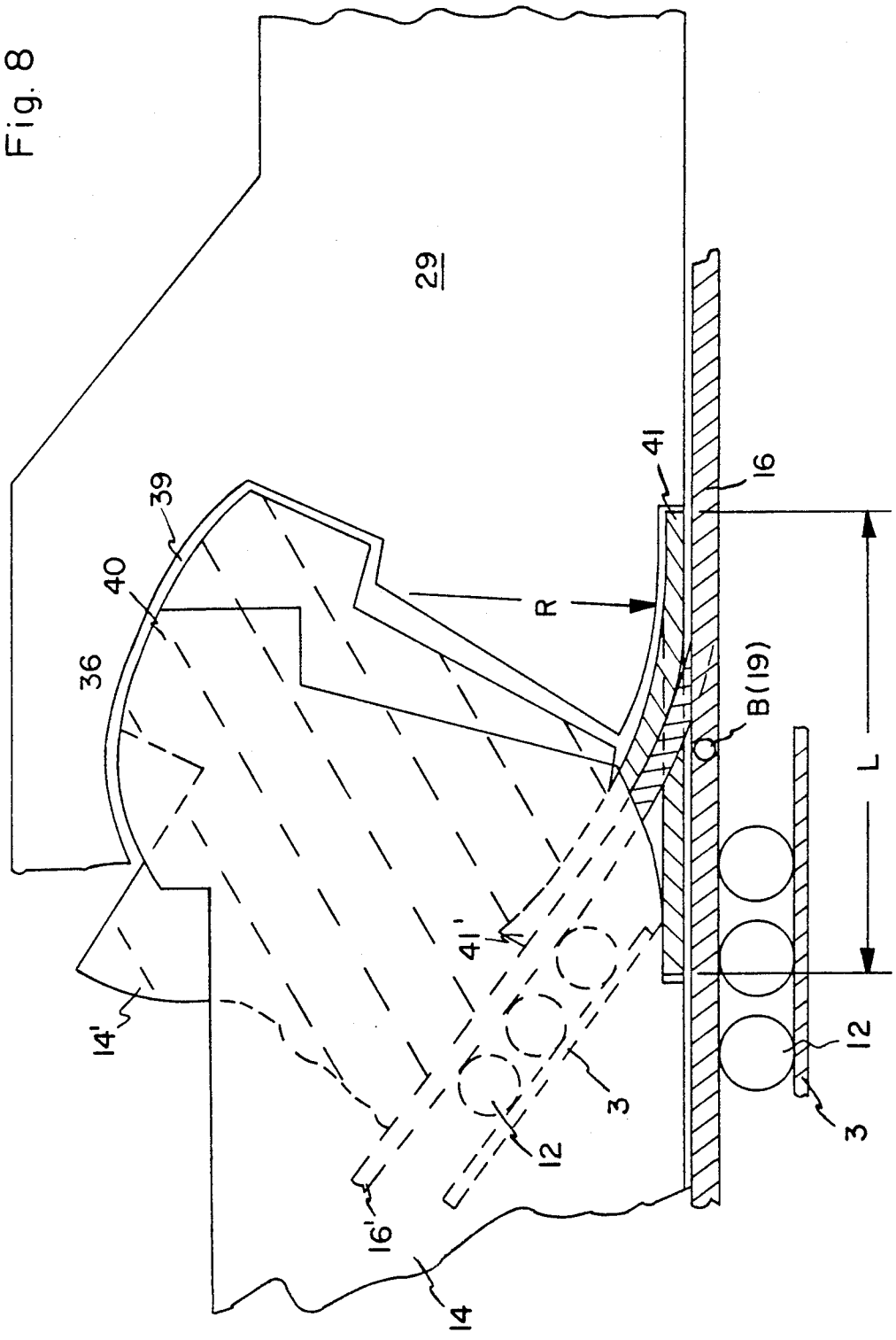

CONTINUOUSLY WORKING PRESS

BACKGROUND OF THE INVENTION

1. Field of the Invention

The invention relates to a continuously working press, and, more particularly, to a continuously working press for the production of chipboards, fiberboard, plastic boards, plywood boards or the like.

Such presses typically include flexible, endless steel bands which transmit the pressing force and draw the article to be pressed through the press and which are supported with an adjustable press nip against abutments of a press platen and a press ram via co-rotating rolling rods guided with their axes transverse relative to the running direction of the band. The angle of the entry gap is varied by way of an adjusting device in the press ram.

2. Discussion of the Related Art

A continuously working press of this type is described in German Offenlegungsschrift No. 2,448,794, (see related U.S. Pat. No. 3,981,666) in which, the angle of the entry gap is variable by means of an adjusting device in the press ram. In this adjusting device, an articulated beam in the press ram is displaced by raising or lowering the upper deflecting drum, with the articulated beam rotating about the axis of rotation of an intermediate drum and forming a rigid entry region between the two drums. The rolling rods, being supported on a rigid rolling surface in the entry region, cannot self-stabilize in their longitudinal axis under differing pressure conditions arising from the article to be pressed. This creates a danger that the rolling rods will not arrive in the high-pressure region perfectly at right angles to the feed direction. This in turn means that the rolling rods are no longer an exact distance from one another. A run-on of the rolling rods and their destruction could be the consequence.

Another disadvantage of the previously known press is that the entry region consists of a single rolling surface, and the angle of the entry gap therefore has to be adjusted via an axis of rotation. However, the permissible steel-band bending/buckling load requires at least a radius in the pivot axis which is 500 times larger than the steel-band thickness. But in view of the steel-band bending/buckling load, a setting angle of only approximately 2.5 can be obtained, since the wear of the steel bands at this location would otherwise be too great. However, a larger angle is necessary to produce chipboards with low-compressed covering layers, and is also necessary for the starting operation.

SUMMARY OF THE INVENTION

An object on which the invention is based is to provide a continuously working press, in which the entry gap can be adjusted in the entry region of the press ram in a simple way according to a predetermined geometry in the course of the production or assembly, a controllable pressure profile of controlled adjustability can be built up in the entry region, and the entry region gives the rolling rods a sufficient degree of freedom for self-stabilization.

In accordance with one aspect of the invention, a continuously working press includes a press frame, and a press ram and a press platen connected to the press frame and which define an adjustable press nip located in a pressing region positioned therebetween. First and second endless steel bands transmit a pressing force to an article to be pressed and draw the article through an entry gap, an entry region, and through the pressing region. The entry region is supported on a support member and is divided into a resilient rolling rod alignment region and a rigid pressure build-up region. Driving drums and deflection drums guide the first and second endless steel bands around the press platen and the press ram, respectively, and a plurality of co-rotating rolling rods support the steel bands as they travel through the press. These rolling rods have axes of rotation transverse to a running direction of the steel bands. In addition, an adjusting device located within the press adjusts the entry gap. The adjusting device includes an articulated crosshead anchored in the press frame and pivotable about an axis of rotation, a pressure holding plate located within the entry region and adjustable about an axis of rotation and which acts non-positively but resiliently on the rolling rods as they travel through the entry region, and a plurality of hydraulic supporting members located between the articulated crosshead and the pressure holding plate and which act on the support device with a pressure profile that increases continuously towards the pressing region.

In accordance with another aspect of the invention, the press includes a supporting beam connected to the supporting members and a pivotable articulated plate covering the pressure build-up region. A heating plate may be located proximate an end of the entry region, with a first portion of the articulated plate being rotatably connected to the press frame and another portion of the plate being supported on one of the supporting beam and the heating plate so as to be rotatable and to be capable of being raised and lowered with respect to the press frame.

In accordance with still another aspect of the invention, a method is provided for adjusting an entry gap of a press, the press comprising a press frame, a press ram and a press platen facing one another to define a pressing region therebetween, bands for transmitting a pressing force to an article to be pressed and for drawing the article through the entry gap, an entry region, and through the pressing region, the entry region being supported on a support member and being divided into a resilient rolling rod alignment region and a rigid pressure build-up region, and a plurality of rolling rods adapted to support each of the band means as it draws the article through the press. The method includes the steps of pivoting an articulated crosshead anchored in the press frame and pivotable about an axis of rotation, applying an adjustable force to a pressure holding plate located within the entry region and adjustable about an axis of rotation so that the pressure holding plate acts non-positively but resiliently on the rolling rods as they travel through the entry region, and applying a pressure profile on the support member that increases continuously towards the pressing region.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

An exemplary embodiment of the invention is described in detail below and illustrated in the accompanying drawings, wherein:

FIGS. 5 to 8 show versions of articulated systems for constructive transfer.

DETAILED DESCRIPTION OF THE PREFERRED EMBODIMENTS

The adjustment of the entry gap and the build-up of an adjustable pressure profile according to technological requirements are necessary, for example, in the production of chipboards with a high bending strength and with high-compressed covering layers, the entry gap should be equal to the nominal thickness. That is to say the entry angle will be approximately equal to zero. These measures are also necessary in the production of lightweight boards with low-compressed covering layers, in which the entry gap should be equal to twice to four times the nominal thickness. That is to say the entry angle will amount to approximately 2.5–5°. In addition, these measures are necessary for the starting operation during the entry of the chip cake, in which the entry angle should be between 0 and 5°, depending on the intensity of the precompression of the chip cake or the structure of the article to be pressed.

The rolling-rod alignment device and pressure build-up bridge which act in the regions II and III of the press ram, described below, are supported via hydraulic adjusting members or via spring elements relative to an articulated crosshead pivotable in the press ram. The alignment device is also supported at the point "B" and to the press platen and steel band. The particular angular position is checked during operation in view of the steel-band bending/buckling load via an angle-monitoring sensor means. The controllable pressure profile from the entry tangent via the rolling-rod alignment device and pressure build-up bridge as far as the high-pressure region requires a statically satisfactory separation of the regions II, III, and IV by means of articulated systems. The articulated systems, the resilient hydraulic support of the rolling-rod alignment device, and the permanent support of the pressure build-up bridge against the steel band make a continuous non-positive connection between the rolling rods, the alignment device, and the steel band, both in the idling mode and in the load mode. This is necessary for the operationally reliable functioning of an adjustable entry gap.

Figure 1:
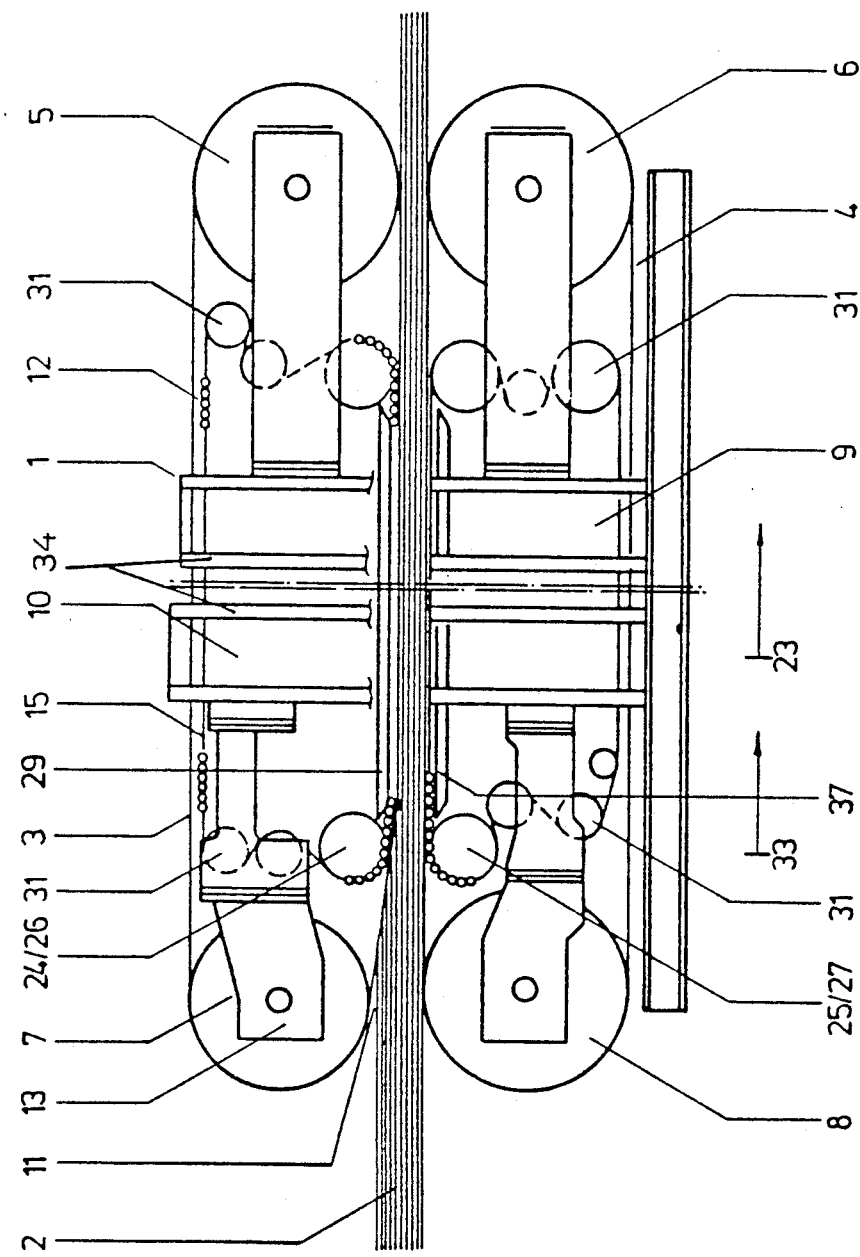
FIG. 1 shows a side view of the press according to an embodiment the invention in a diagrammatic representation.

According to FIG. 1, the continuously working press 1 consists of a press platen 9, a movable press ram 10 and tension columns (not shown) connecting these. To adjust a press nip, the press ram 10 is moved up and down by hydraulic piston/cylinder arrangements (not shown) and is then retained in the selected position. Steel bands 3 and 4 are respectively guided round the press platen 9 and press ram 10 via respective driving drums 5 and 6 and deflecting drums 7 and 8. To prevent thermal stresses and therefore different extensions, the entire system of the entry alignment device is maintained at a uniform operating temperature by providing a heating means, which in this case comprises heating plates 29 and 37 attached to the press platen 9, the press ram 10 and the rotating steel bands 3 and 4. To reduce the friction between the heating plates 37 and 29, a rotating rolling-rod carpet formed from rolling rods 12 is respectively provided. The rolling rods 12, the axes of which extend transversely relative to the band run-through direction, i.e., the direction of travel of steel bands 3 and 4, are joined together on the two longitudinal sides of the press 1 in plate-link chains 15 with a predetermined pitch division. The rolling rods roll between the heating plates 37 and 29 of the press ram 10 and press platen 9, on the one hand, and on the steel bands 3 and 4, on the other hand, and thereby help the bands 3 and 4 take up the article 2 to be pressed and to guide it through the press 1.

Figure 2:
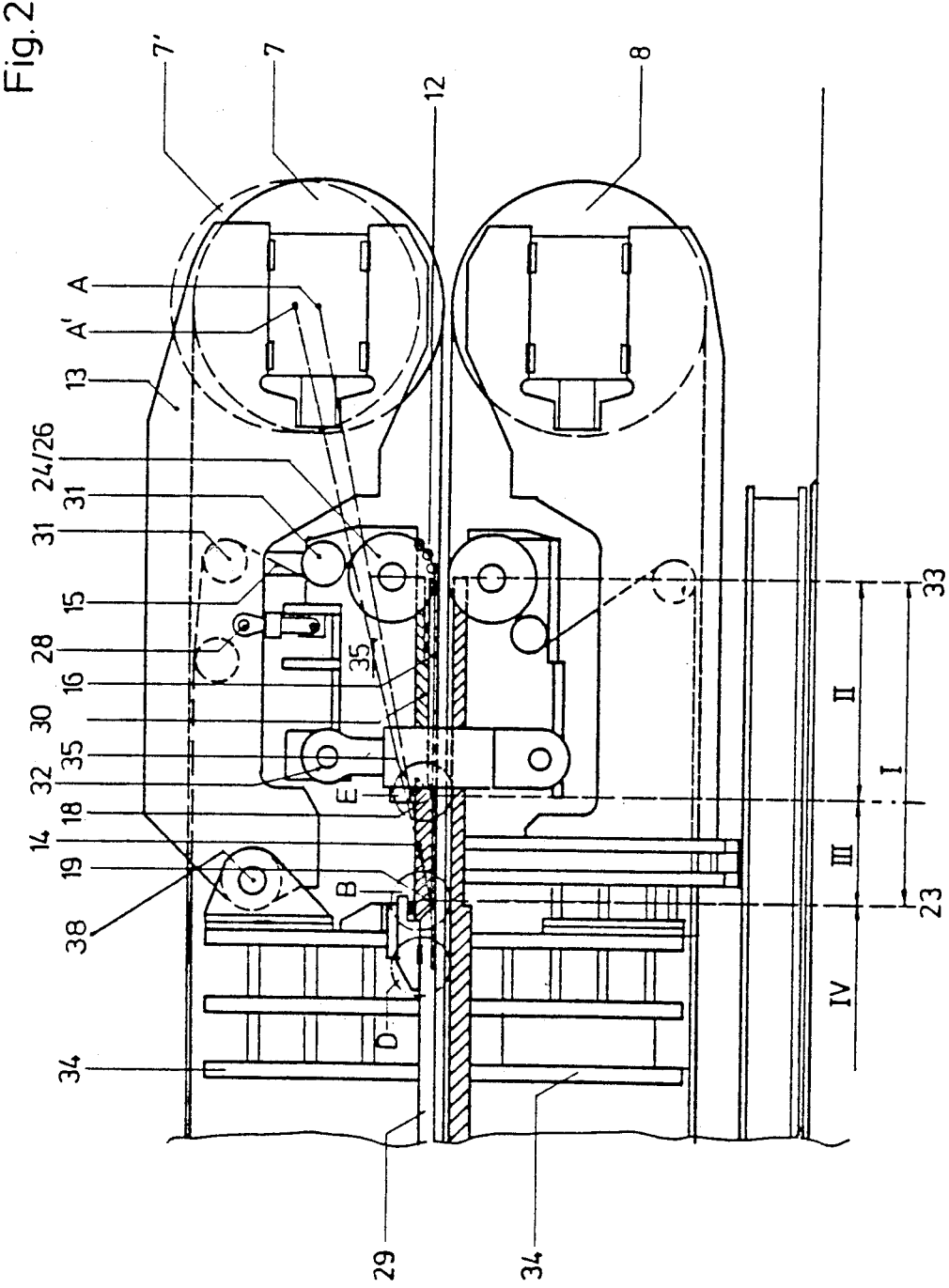
FIG. 2 shows the entry region of the press according to FIG. 1 with an angle-adjusting device according to the invention.

It is further evident from FIGS. 1 and 2 that the rolling rods 12 are introduced positively and non-positively into the horizontal press plane by introduction gearwheels 24 and 25, and that the plate-link chains 15 are introduced by two entry gearwheels 26 and 27 arranged laterally relative to an entry heating plate 30. The introduction gearwheels 24 and 25 are fastened to the press ram 10 and the press platen 9, respectively. The entry gearwheels 26 and 27 are fastened to the press ram 10 and the press platen 9, respectively, each on an axle. Reference numeral 33 denotes the start of the entry region or the entry tangent of the rolling rods 12 into the press zone, and numeral 23 denotes the end of the entry region "E" and the start of the high-pressure zone IV. The rolling-rod rotation in the press platen 9 and press ram 10 is guided via deflecting rollers 31.

Figure 3:
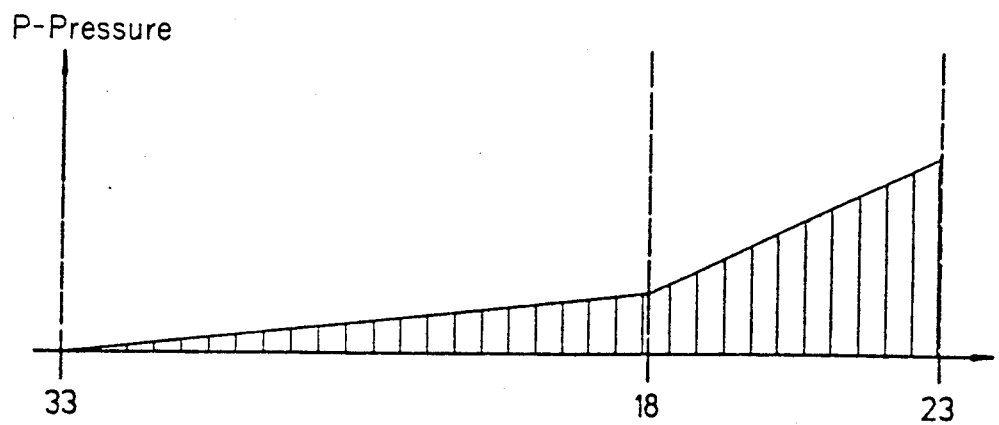
FIG. 3 shows a diagram of the trend of the pressing force in the entry region I.

As illustrated in FIG. 2, the rolling rods 12 are introduced by the introduction gearwheels 24 and 25 from the entry tangent 33 into the entry region I with an increasing pressure trend. FIG. 3 shows a diagram of the increasing pressure trend in the entry region I. For the statically satisfactory separation of the entry region I into the rolling-rod alignment region II, the pressure build-up region III, and the high-pressure region IV, the respective regions are connected, from the point of articulation 18, by means of articulated systems.

The adjustment of the entry gap 11 by the raising or lowering of the deflecting drum 7 from position "A" to position "A", or vice versa, is shown clearly in FIG. 2. By means of the measures according to the invention, the position "A" is set identical to the deflecting-drum center axis, and the position "B" is set identical to the nominal thickness of the finished pressed article at the start of the high-pressure region, and both positions are adjustable in a controlled way. At the same time, the entry angle alpha forms about the position "B" or the axis of rotation 19. The entry angle is between 0 and approximately 5°, depending on the presetting of the path positions and according to the technological requirements. The rolling-rod alignment device (not shown), is supported resiliently relative to an articulated crosshead 1 and the steel band 3 via either hydraulic adjusting members 28 and 32 or spring elements.

As a movable carrier and fastening support point for the rolling-rod alignment device, there is a supporting beam 35, on which the entry heating plate 30 is also arranged, the supporting beam 35 being fixed in the respective position by the adjusting members 28 and 32. Whilst the adjusting member 28 has its fixed point in the articulated crosshead 13, the adjusting member 32 is supported firmly in the press platen 9 at 17. The articulated crosshead 13 is in turn anchored in position "C" about an axis of rotation 38 in the press frame 34. The pressure build-up region III is obtained by means of an articulated plate 14. Plate 14 is connected, in an articulated manner, in position "B" in the press frame 34. Plate 14 is also connected to either the entry heating plate 30 or the supporting beam 35. Whilst, at position "B", the articulated plate 14 is designed to be rotatable about the axis of rotation 19, at position "E" it is arranged so as to be both rotatable and raisable and lowerable by means of an articulated system and the adjusting device. In view of the permissible bending and buckling load of the steel band, the angular setting in positions "B" and "E" between the rolling-rod alignment region II and the pressure build-up region III, or between the supporting beam 35 of the entry heating plate 30 and the articulated plate 14 (pressure build-up bridge), on the one hand, and the articulated plate 14 relative to the heating plate 29, should not exceed an angle of 2.5°. For this purpose, an angle-monitoring sensor means is installed in the adjusting cylinder for the deflecting drum 7. A measuring device may also be provided on the axis of the deflecting drum 7 to measure the position setting of the adjusting device or of the thickness of the article to be pressed.

For the reason mentioned, in the entry region I the controllable pressure profile requires a statically satisfactory separation of the regions II to IV by means of articulated systems, such as are shown in FIGS. 5 to 8. Thus, the positions at "B" and "E" can be designed with round hinges 20 or 21, illustrated in FIGS. 5 and 6, which connect the entry heating plate 30 to either the articulator plate 14 or the press frame 34. Positions "B" and "E" may also be designed with round rotary surfaces 39 according to FIGS. 7 and 8. The version according to FIGS. 7 and 8 affords the advantage that varying shifts between the two rotary beams 36 and 40, which combine to form a rotary surface, do not occur.

Figure 4:
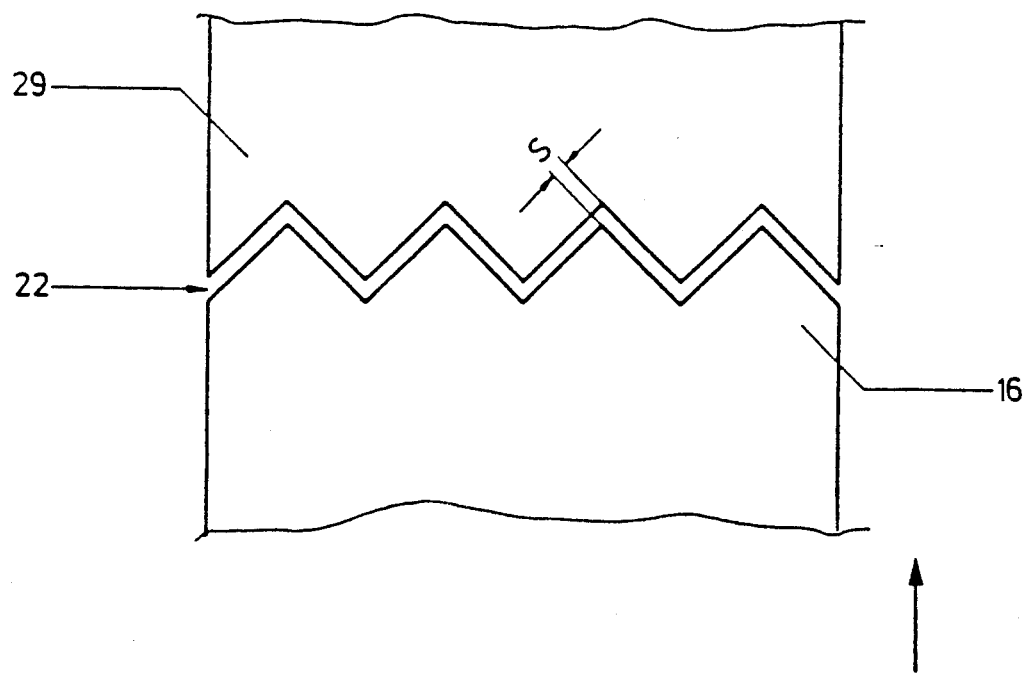
FIG. 4 shows the coupling of the pressure holding plate to the heating plate of the high-pressure region.
Figure 5:
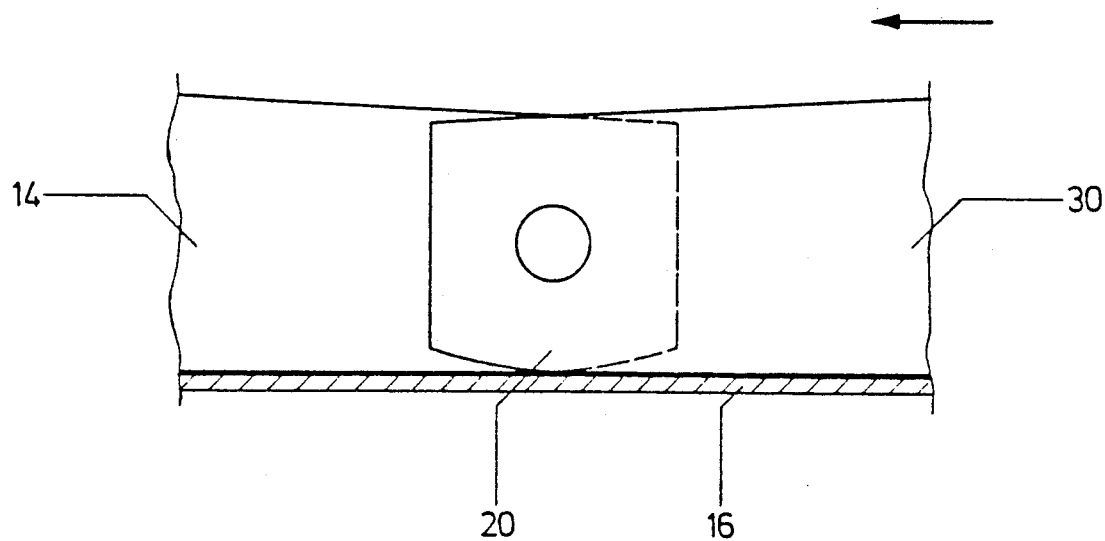
Figure 6:
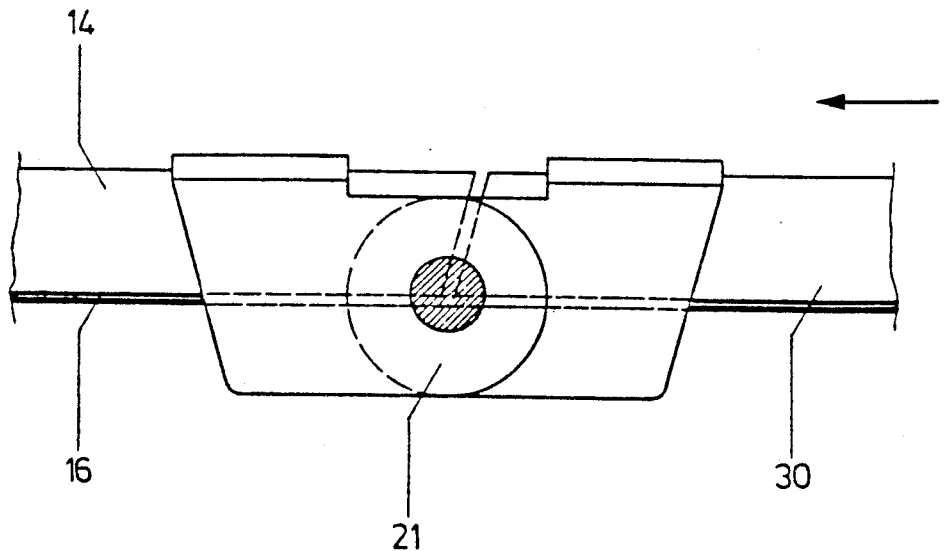

In all of the articulated systems according to FIGS. 5 to 8, the region of articulation is covered by a flexible pressure holding or protection plate 16, so that the rolling rods 12 can roll over a closed surface. To guarantee uniform rolling run-over of the rolling rods 12 into the high-pressure region IV, according to FIG. 4 this run-over at "D" is designed as a sawtooth-like coupling 22 of the pressure holding plate 16. At this location, there is at the same time a length compensation "s" between the surfaces of the articulated plate 14 and of the first heating plate 29 of the high-pressure region IV. Preferably, the pressure holding plate 16 is designed at the same time as a spring plate for the rolling-rod alignment device. The rolling rods 12 thus move flexibly in the entry region I between the steel band 3 and the pressure holding plate 16. For this, the pressure holding plate 16 designed and acting in the manner of a leaf spring is arranged without a rigid support relative to the entry heating plate 30. To simplify the drawing, the rolling rods 12 are merely indicated in FIGS. 1 and 2 and are omitted completely in FIGS. 5 to 7.

A preferred embodiment of an articulated system for the positions "B" and "E" is shown in FIG. 8 only at the position "B". It is evident from this that an intermediate plate 41 and the pressure holding plate (protective plate) 16 bridge the gap "1" elastically and in a cantilevered manner under maximum pressing force. At the same time, the intermediate plate 41 and the pressure holding plate are arranged in the manner of a leaf spring so as to be displaceable within limits relative to the articulated plate 14 and the first heating plate 29 of the high-pressure region IV. The broken-line representation shows the articulated plate 14', pressure holding plate 16' and intermediate plate 41' pivoted about the position "B" with the radius "R". The pressure force is transmitted to the heating plate 29 and therefore into the press frame 34 via the spherical joint 36, 39 and 40.

Thus, the angular adjustment of the entry gap can be carried out in accordance with technological requirements demanded of the pressed article to be produced, and the entry region I can by simple means be separated in a statically satisfactory manner into an elastic rolling-rod alignment region II and a rigid pressure build-up region III.

Another advantage is that, when angular adjustment is performed in accordance with the invention, it is even possible to carry out an adjustment during operation under maximum pressing force, and at the same time obtain a pressure profile of controlled adjustability.

What is claimed is:

1. A continuously working press comprising:
   (A) a press frame;
   (B) a press ram and a press platen connected to said press frame and defining an adjustable press nip located in a pressing region positioned therebetween;
   (C) first and second endless steel bands adapted to transmit a pressing force to an article to be pressed and to draw said article through an entry gap, an entry region, and through said pressing region, said entry region being supported on a support member and being divided into a resilient rolling rod alignment region and a rigid pressure build-up region;
   (D) driving drums and deflection drums adapted to guide said first and second endless steel bands around said press platen and said press ram, respectively;
   (E) a plurality of co-rotating rolling rods adapted to support said steel bands as they travel through said press, said rolling rods having axes of rotation transverse to a running direction of said steel bands; and
   (F) an adjusting device located within said press and adapted to adjust said entry gap, said adjusting device comprising an articulated crosshead anchored in said press frame and pivotable about an axis of rotation, a pressure holding plate located within said entry region and adjustable about an axis of rotation and which is adapted to act non-positively but resiliently on said rolling rods as they travel through said entry region, and a plurality of hydraulic supporting members located between said articulated crosshead and said pressure holding plate and which are adapted to act on said support device with a pressure profile that increases continuously towards said pressing region.

2. A continuously working press as claimed in claim 1, wherein said adjusting device further comprises a supporting beam connected to said supporting members and a pivotable articulated plate covering said pressure build-up region.

3. A continuously working press as claimed in claim 2, further comprising a heating plate located proximate an end of said entry region, and wherein a first portion of said articulated plate is rotatably connected to said press frame and another portion of said plate is supported on one of said supporting beam and said heating plate so as to be rotatable and to be capable of being raised and lowered with respect to said press frame.

4. A continuously working press as claimed in claim 3, further comprising round hinges connecting said heating plate and one of said articulated plate and said press frame.

5. A continuously working press frame as claimed in claim 3, wherein said articulated frame is connected to one of said press frame and said supporting beam via two rotary beams which cooperate with one another to form a rotary surface.

6. A continuously working press as claimed in claim 2, further comprising an intermediate plate positioned between said pressure holding plate and said articulated plate.

7. A continuously working press as claimed in claim 1, further comprising means for sensing an angular position of said entry gap.

8. A continuously working press as claimed in claim 1, further comprising a sensor mounted on the axis of one of said deflecting drums and adapted to measure one of the thickness of the article to be pressed and a setting of said adjusting device.

9. A continuously working press as claimed in claim 1, further comprising a heating plate located in said high pressure region and connected to said pressure holding plate via a sawtooth coupling.

10. A press, comprising:
(A) a press frame;
(B) a press ram and a press platen facing one another to define a pressing region therebetween;
(C) band means for transmitting a pressing force to an article to be pressed and for drawing said article through an entry gap, an entry region, and through said pressing region, said entry region being supported on a support member and being divided into a resilient rolling rod alignment region and a rigid pressure build-up region;
(D) a plurality of rolling rods adapted to support each of said band means as it draws said article through said press; and
(E) adjusting means, located within said press, for adjusting said entry gap, said adjusting means comprising an articulated crosshead anchored in said press frame and pivotable about an axis of rotation, a pressure holding plate located within said entry region and adjustable about an axis of rotation and adapted to act non-positively but resiliently on said rolling rods as they travel through said entry region, and supporting means, located between said articulated crosshead and said pressure holding plate, for acting on said support member with a pressure profile that increases continuously towards said pressing region.

11. A continuously working press as claimed in claim 10, wherein said adjusting means further comprises a supporting beam connected to said supporting members and a pivotable articulated plate covering said pressure build-up region.

12. A continuously working press as claimed in claim 11, further comprising a heating plate located approximate an end of said entry region, and wherein a first portion of said articulated plate is rotatably connected to said press frame and another portion of said plate is supported on one of said supporting beam and said heating plate so as to be rotatable and to be capable of being raised and lowered with respect to said press frame.

13. A continuously working press as claimed in claim 12, further comprising round hinges connecting said heating plate and one of said articulated plate and said press frame.

14. A continuously working press frame as claimed in claim 12, wherein said articulated frame is connected to one of said press frame and said supporting beam via two rotary beams which cooperate with one another to form a rotary surface.

15. A continuously working press as claimed in claim 11, further comprising an intermediate plate positioned between said pressure holding plate and said articulated plate.

16. A continuously working press as claimed in claim 10, further comprising a heating plate located in said high pressure region and connected to said pressure holding plate via a sawtooth coupling.

17. A continuously working press as claimed in claim 10, further comprising means for sensing one of a position setting of said adjusting means and the thickness of said article.

18. A continuously working press as claimed in claim 10, further comprising a sensor mounted on the axis of one of said deflecting drums and adapted to measure the thickness of the article to be pressed.

19. A method of adjusting an entry gap of a press, said press comprising a press frame, a press ram and a press platen facing one another to define a pressing region therebetween, band means for transmitting a pressing force to an article to be pressed and for drawing said article through said entry gap, an entry region, and through said pressing region, said entry region being supported on a support member and being divided into a resilient rolling rod alignment region and a rigid pressure build-up region, and a plurality of rolling rods adapted to support each of said band means as it draws said article through said press, said method comprising the steps of:
(A) pivoting an articulated crosshead anchored in said press frame and pivotable about an axis of rotation;
(B) applying an adjustable force to a pressure holding plate located within said entry region and adjustable about an axis of rotation so that said pressure holding plate acts non-positively but resiliently on said rolling rods as they travel through said entry region; and
(C) applying a pressure profile on said support member that increases continuously towards said pressing region.

20. A method as claimed in claim 19, further comprising the steps of rotating an articulated plate about said press frame at a first portion rotatably connected to said press frame, and rotating as well as raising and lowering another portion of said articulated plate which is supported on one of a supporting beam and a heating plate.

* * * * *